Nov. 10, 1931.　　C. ROSENTHAL ET AL　　1,831,395
CLUTCH PULLEY
Filed Feb. 21, 1930　　2 Sheets-Sheet 1
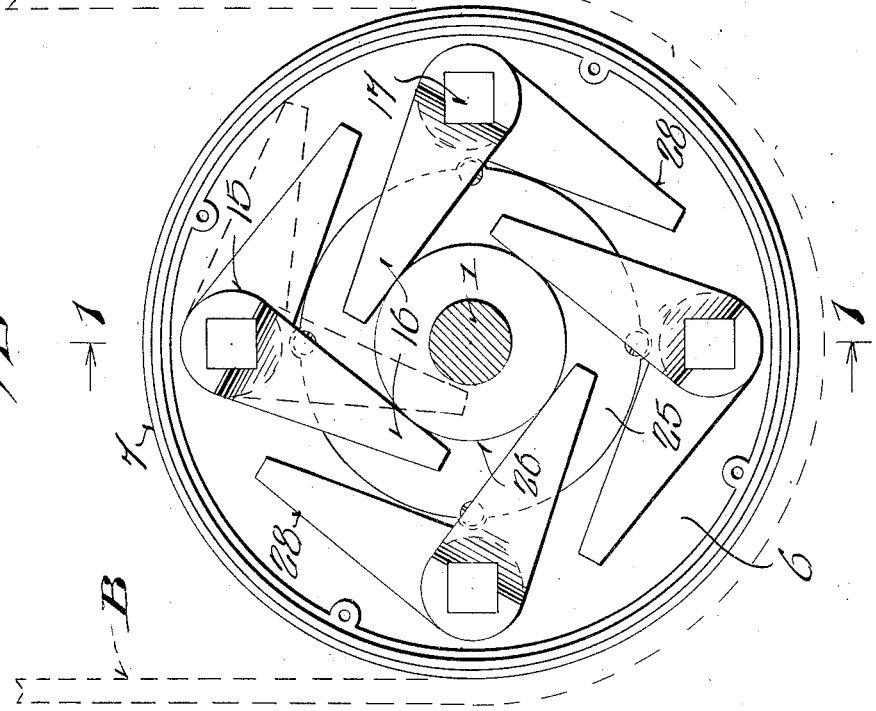
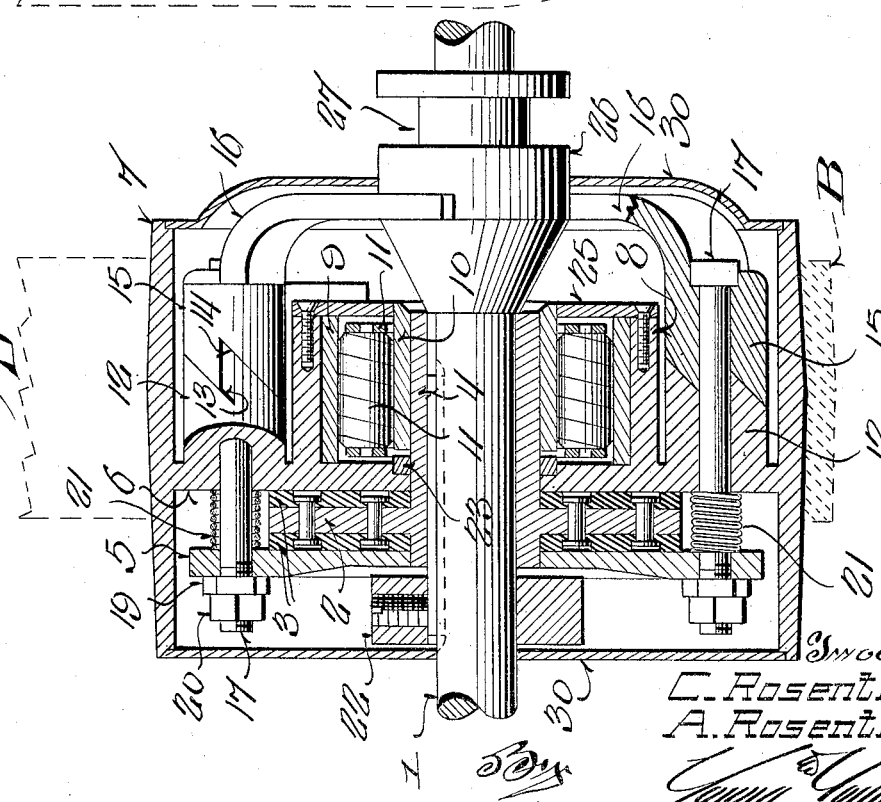
Inventors
C. Rosenthal
A. Rosenthal Nov. 10, 1931.  C. ROSENTHAL ET AL  1,831,395
CLUTCH PULLEY
Filed Feb. 21, 1930  2 Sheets-Sheet 2

Inventors,
C. Rosenthal
A. Rosenthal

Patented Nov. 10, 1931

1,831,395

UNITED STATES PATENT OFFICE

CARL ROSENTHAL AND AUGUST ROSENTHAL, OF WEST ALLIS, WISCONSIN, ASSIGNORS TO ROSENTHAL MANUFACTURING CO., OF WEST ALLIS, WISCONSIN

CLUTCH PULLEY

Application filed February 21, 1930. Serial No. 430,262.

This invention pertains generally to clutches of the disc type, applicable to brakes, pulleys, and the like.

The invention has primarily for its object to provide a clutch of simple, compact structure, and provided with novel actuating means whereby positive and effectual clutching engagement is obtained through minimum effort.

Incidental to the foregoing, a more specific object resides in the provision of a disc clutch provided with a plurality of cam actuating levers pivotally mounted closely adjacent the outer periphery of the gripping members and actuated adjacent the axis of the clutch, whereby maximum leverage is obtained to provide positive engagement of the clutching members.

A further object resides in the privision of a clutch of the foregoing character which, because of its compactness, may be completely housed within a belt pulley or the like, to protect the same from dirt and dust, and facilitate lubrication of the working parts.

A more specific object is to provide a clutch pulley having the foregoing characteristics, and in which the gripping members are carried by the pulley and journalled upon a disc member keyed to the shaft.

Another object resides in the provision of a plurality of cam actuating levers pivotally carried by one of the gripping members to operate in a plane transverse to the axis of the clutch.

A still further object is to provide actuating levers pivotally mounted upon the connecting studs of the gripping members and having cam engagement with one of the gripping members to effect the clutching action.

Another object, incidental to the foregoing, resides in the provision of means to prevent engagement of the cam levers with the actuating element or shaft during disengagement of the clutch.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a longitudinal section through a clutch constructed in accordance with the present invention and applied to a pulley, the view being taken on line 1—1 of Figure 2;

Figure 2 is an end elevation with one of the closure plates removed;

Figure 3:
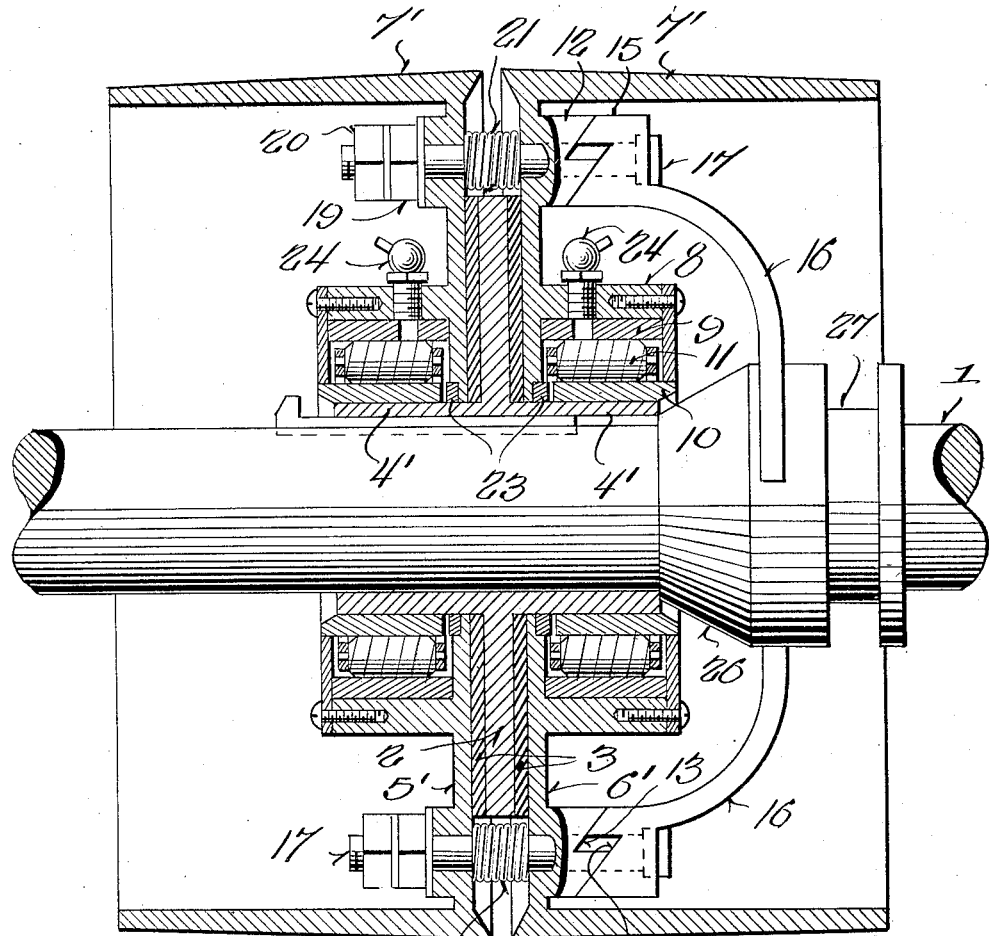
Figure 3 is a longitudinal section of a modified form of the invention, also applied to a pulley.

Referring now more particularly to the accompanying drawings, the numeral 1 designates a driven shaft upon which is mounted a disc member 2, the faces of which are provided with the usual frictional discs 3 formed of leather, composition, or other suitable material. The disc 2 is provided with an elongated hub 4, keyed or splined upon the shaft 1 to cause the disc to rotate therewith.

Positioned upon opposite sides of the disc member 2 are a pair of annular gripping plates 5 and 6 respectively, which in the clutching operation serve to engage the frictional faces 3 of the disc member.

Referring particularly to that form of the invention illustrated in Figures 1 and 2, the gripping plate 6 is provided with a pulley face 7 for reception of the conventional belt B, as indicated in dotted lines. Obviously, the face of the pulley may be either crowned or flat, as desired, although in the present instance the same is shown as slightly crowned in order to secure such trackage of the belt as to properly align strain with the journal bearings, as will be hereinafter described.

In instances where the present invention is applied to pulleys, the gripping members must be rotatably journalled about the driven shaft. Therefore, in order to provide a compact structure which may be suitably housed within the confined space of a pulley, the gripping plate 6 is provided with an annular flange 8 for reception of an anti-friction roller bearing comprising concentric bushings 9 and 10, respectively, between which the roller race 11 is positioned.

The outer bushing 9 is snugly fitted within the annular flange 8, while the inner bushing 10 is mounted upon the end of the extended hub 4. Thus, it will be seen that the gripping member 6 is journalled upon the hub 4 of the disc member 2 by means of an anti-frictional bearing which allows the pulley to rotate freely, independent of the disc, and thus avoids overheating and other objectionable features found in present types of pulley clutches.

At spaced intervals, closely adjacent its outer periphery, the gripping plate 6 is provided with laterally extending bosses 12, the outer faces of which are provided with a series of inclined cammed surfaces 13 which cooperate with the cammed faces 14 formed upon the hubs 15 of the clutch actuating levers 16.

As best seen in Figure 1, studs or bolts 17, passing through the hubs of the actuating levers 16, and the bosses 12, serve to pivotally connect the actuating levers to the gripping members 6, and in addition, the outer ends of the studs 17 carry the gripping member 5, opposed to the gripping member 6 and cooperating therewith to effect clutching engagement of the disc 2.

The gripping member 5 is held upon the studs 17 by means of the nuts 19 and lock nuts 20, which also allow for relative adjustment between the gripping members. In order to effect spreading of the gripping members, upon release of the clutch, expansion springs 21 are mounted upon the studs 17 and disposed between the gripping members 5 and 6. Obviously, as the actuating levers 16 are released, the springs 21 will force the gripping members apart, and through the studs 17, cause the actuating levers 16 to be rotated upon the cam faces of the bosses 12 and assume their normal position, which allows sufficient clearance between the gripping members and the faces of the disc 2 to avoid drag. Obviously, as the gripping members are expanded, both must shift longitudinally of the shaft 1 and, therefore, to insure equal travel of the gripping members, a retaining collar 22 is secured on the shaft 1 adjacent the gripping member 5, while the plate 6 will abut against the inner roller bushing 10; a washer 23, carried by the plate 6 and engaging the bushing 10, serving to eliminate wear upon the plate.

The roller bearing may be lubricated in any suitable way, as for instance, through a grease plug 24, as shown in Figure 3, and in order to retain the lubricant forced into the bearing, a cover plate 25 is secured to the outer edge of the annular flange 8.

For actuating the levers 16 to rotate the hubs upon the cam faces of the bosses 12, a sliding cone 26 is mounted upon the shaft 1 and provided with an annular groove 27 for reception of a conventional spanner, not shown. In that position of the cone illustrated in Figure 1, the levers 16 are riding upon the high side which has caused the hubs 15 to be rotated upon the bosses 12, resulting in outward longitudinal movement of the hubs, which action, through the studs 17, causes the gripping members to be contracted to engage the faces of the disc 2 to effect clutch operation. Obviously, as the cone 26 is moved outwardly, the levers 16 will ride upon the cone surface and be returned to their normal position through action of the springs 21, as heretofore explained.

In order to avoid undue wear upon the levers 16 or the cone 26, when the clutch is disengaged, the levers 16 are provided with tail members 28 which are designed to engage the inner periphery of the pulley flange 7 and thus limit the inward movement of the levers 16, as shown in dotted lines in Figure 2, in which position the levers 16 are held free of the shaft 1.

Referring to the modification illustrated in Figure 3, the clutch structure and operation are identical to that form illustrated in Figures 1 and 2, with the exception that both gripping members 5' and 6' are duplicated, each being provided with a pulley flange 7'. In this instance, the disc member 2 is provided with oppositely extending hub portions 4' for reception of the antifriction bearings, upon which the gripping members are journalled.

Figure 4:
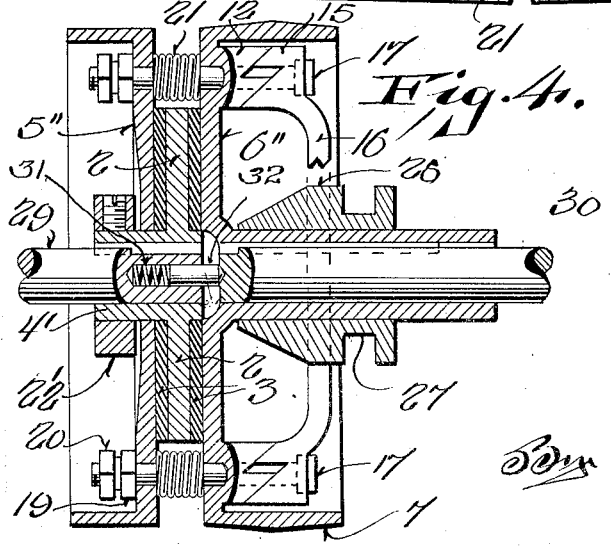
Figure 4 is a longitudinal section illustrating the invention applied as a clutch between aligned shafts.

The clutch structure illustrated in Figure 4 is designed to effect clutching engagement between the aligned shafts 29 and 30, one of which comprises a drive shaft, and while in most instances, it is desirable to mount the disc 2 upon the drive shaft, such arrangement is not essential to the operation of the invention.

In the clutch structure shown in Figure 4, the disc 2 is keyed to the shaft 29, while the clutching member 6'' is keyed or splined to the shaft 30, and carries a cooperating gripping plate 5'' through the stud connections 17, as hereinafter described.

In this instance, longitudinal shifting of the gripping members, when released, is prevented by the retaining collar 22' mounted upon the hub 4 of the disc member 2. Obviously, as the gripping members 5'' and 6'' are expanded by the springs 21, shifting of the member 5'' will be limited by the retaining collar 22', thus causing both members 5'' and 6'' to be held in spaced relation to the disc 2, whereby possible drag is eliminated.

To further facilitate disengagement of the gripping members 5″ and 6″ from the disc 2, it will be noted that the shaft 29 is provided with a recess 31 for reception of a spring-urged plunger 32 which abuts the end of the shaft 30. In operation, the shaft 29 acts as the driver. The work or load is carried upon the shaft 30, and consequently as the gripping members are released, through actuation of the levers 16, the gripping member 5″ will be readily released by the springs 21. However, because of the load upon the shaft 30, there might be a tendency for the gripping member 6″ to remain in engagement with the disc 2, thus causing a drag and heating of the clutch.

This objection is readily overcome by the spring plunger 32 which, cooperating with the springs 21, serves to shift the shaft 30 and gripping members 6″ longitudinally thus insuring a spaced relation between the gripping members and the disc upon release of the clutch.

From the foregoing description, taken in connection with the accompanying drawings, operation of the present invention will be quite apparent, and is identical in the various forms illustrated, in that the clutch operation is effected upon oscillation of the levers 16 upon the corresponding bosses 12, causing them to ride outwardly upon the cam faces of the bosses to contract the gripping members and effect positive engagement of the disc.

In this connection, particular attention is directed to the fact that the actuating levers are pivotally mounted upon one of the gripping members closely adjacent its outer periphery, and being actuated closely adjacent the axis of the gripping member, maximum leverage is obtained, whereby positive clutching is effected through minimum effort. It will also be noted that the levers 16 oscillate in a plane transverse to the axis of the clutch, thus providing for an exceedingly compact structure essential to the application for which the present invention is designed.

In addition to the foregoing, where it is desired to completely house the clutch, to protect the same against dirt, and facilitate lubrication of the working parts, end closure plates 30 may be secured to the sides of the pulley flange 7, as shown in Figure 1, thus completely housing the working parts and avoiding the entrance of dirt or grit, with resultant wear and hindrance of operation.

It is to be understood that unless otherwise specified in referring to clutches throughout the specification, the term is meant to include any application of the invention, such as brakes, clutch pulleys, or clutches, as the mode of operation and the novel features of construction present similar advantages in all instances.

Furthermore, while the invention specifically includes brakes and clutches, it will be understood that the same may be applied to control relative movement between two members, as in transmissions, wheels, and the like.

We claim:

1. A device of the character described comprising a drive shaft, a clutch disc secured on said shaft and provided with a hub extension, a pair of gripping members for engagement with said disc, one of said members being provided with a peripheral pulley face, an annular flange carried by said pulley faced member and positioned substantially centrally thereof, an anti-frictional bearing disposed between said flange and said hub extension, cam actuating levers carried by said flanged gripping member between said flange and its peripheral pulley face for effecting operation of said gripping members, and means mounted on said shaft for actuating said levers.

2. A device of the character described comprising a drive shaft, a clutch disc secured on said shaft and provided with a hub extension, a pair of gripping members for engagement with said disc, one of said members being provided with a peripheral pulley face, an annular flange carried by said pulley faced member and positioned substantially centrally thereof, an anti-frictional bearing disposed between said flange and said hub extension, cam actuating levers carried by said flanged gripping member between said flange and its peripheral pulley face for effecting operation of said gripping members, and means mounted on said shaft for rotating said levers in a plane transverse to the axis of said disc.

3. A device of the character described comprising a drive shaft, a clutch disc secured on said shaft and provided with a hub extension, a pair of gripping members for engagement with said disc, one of said members being provided with a peripheral pulley face, an annular flange carried by said pulley faced member and positioned substantially centrally thereof, an anti-frictional bearing disposed between said flange and said hub extension, actuating levers carried by said flanged gripping member for effecting operation of said gripping members, and means engageable with said gripping members when spread to prevent their longitudinal shifting.

4. A device of the character described comprising a drive shaft, a clutch disc secured on said shaft and provided with a hub extension, a pair of gripping members for engagement with said disc, one of said members being provided with a peripheral pulley face, an annular flange carried by said pulley faced member and positioned substantially centrally thereof, an anti-frictional bearing disposed between said flange and said hub extension, actuating levers carried by said flanged gripping member for effecting operation of said gripping members, and means engageable with the outer faces of said gripping members when spread to prevent their longitudinal shifting.

5. A device of the character described comprising a drive shaft, a clutch disc secured on said shaft and provided with a hub extension, a pair of gripping members for engagement with said disc, one of said members being provided with a peripheral pulley face, an annular flange carried by said pulley faced member and positioned substantially centrally thereof, an anti-frictional bearing disposed between said flange and said hub extension, actuating levers carried by said flanged gripping member for effecting operation of said gripping members, means engageable with the outer faces of said gripping members when spread to prevent their longitudinal shifting, and means mounted on said shaft for rotating said levers in a plane transverse to the axes of said discs.

In testimony that we claim the foregoing we have hereunto set our hands at West Allis, in the county of Milwaukee and State of Wisconsin.

CARL ROSENTHAL.
AUGUST ROSENTHAL.